US008860688B2

(12) United States Patent
Tse et al.

(10) Patent No.: US 8,860,688 B2
(45) Date of Patent: Oct. 14, 2014

(54) 3D INTERACTIVE INPUT SYSTEM AND METHOD

(75) Inventors: Edward Tse, Calgary (CA); David G. Popovich, Calgary (CA); Patrick Weinmayr, Calgary (CA); Wallace I. Kroeker, Calgary (CA)

(73) Assignee: SMART Technologies ULC (CA)

( * ) Notice: Subject to any disclaimer, the term of this patent is extended or adjusted under 35 U.S.C. 154(b) by 896 days.

(21) Appl. No.: 13/038,810

(22) Filed: Mar. 2, 2011

(65) Prior Publication Data

US 2012/0223909 A1 Sep. 6, 2012

(51) Int. Cl.
*G06F 3/041* (2006.01)
*G06T 15/00* (2011.01)
*G06F 3/03* (2006.01)
*G06F 3/01* (2006.01)

(52) U.S. Cl.
CPC .............. *G06F 3/017* (2013.01); *G06F 3/0304* (2013.01)
USPC .......................................... 345/174; 345/419

(58) Field of Classification Search
USPC .................................. 345/174, 419
See application file for complete search history.

(56) References Cited

U.S. PATENT DOCUMENTS

| | | | |
|---|---|---|---|
| 3,647,284 A * | 3/1972 | Elings et al. ................... | 359/858 |
| 5,448,263 A | 9/1995 | Martin | |
| 6,141,000 A | 10/2000 | Martin | |
| 6,337,681 B1 | 1/2002 | Martin | |
| 6,747,636 B2 | 6/2004 | Martin | |
| 6,803,906 B1 | 10/2004 | Morrison et al. | |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 7,352,340 B2 | 4/2008 | Utt et al. | |
| 7,980,957 B2 * | 7/2011 | Schumm, Jr. et al. .......... | 472/59 |
| 2004/0179001 A1 | 9/2004 | Morrison et al. | |
| 2009/0109176 A1* | 4/2009 | Fein et al. ..................... | 345/158 |
| 2010/0023895 A1 | 1/2010 | Benko et al. | |
| 2010/0149182 A1* | 6/2010 | Butler et al. .................. | 345/424 |

* cited by examiner

*Primary Examiner* — Jonathan Boyd
(74) *Attorney, Agent, or Firm* — Katten Muchin Rosenman LLP

(57) ABSTRACT

A three-dimensional (3D) interactive input system comprises a holographic image generator defining an enclosed space to accommodate a 3D object and configured to generate a holographic image of the 3D object that appears adjacent an input region of the holographic image generator. A projection unit is configured to project image data onto the 3D object, the image data projected onto the 3D object appearing on the holographic image. A sensing unit is configured to detect user proximity to the input region. Processing structure is configured to process sensing unit output and in response, update image data projected by the projection unit.

16 Claims, 15 Drawing Sheets

(Image Frame of Imaging Device 380a)

(Image Frame of Imaging Device 380b)

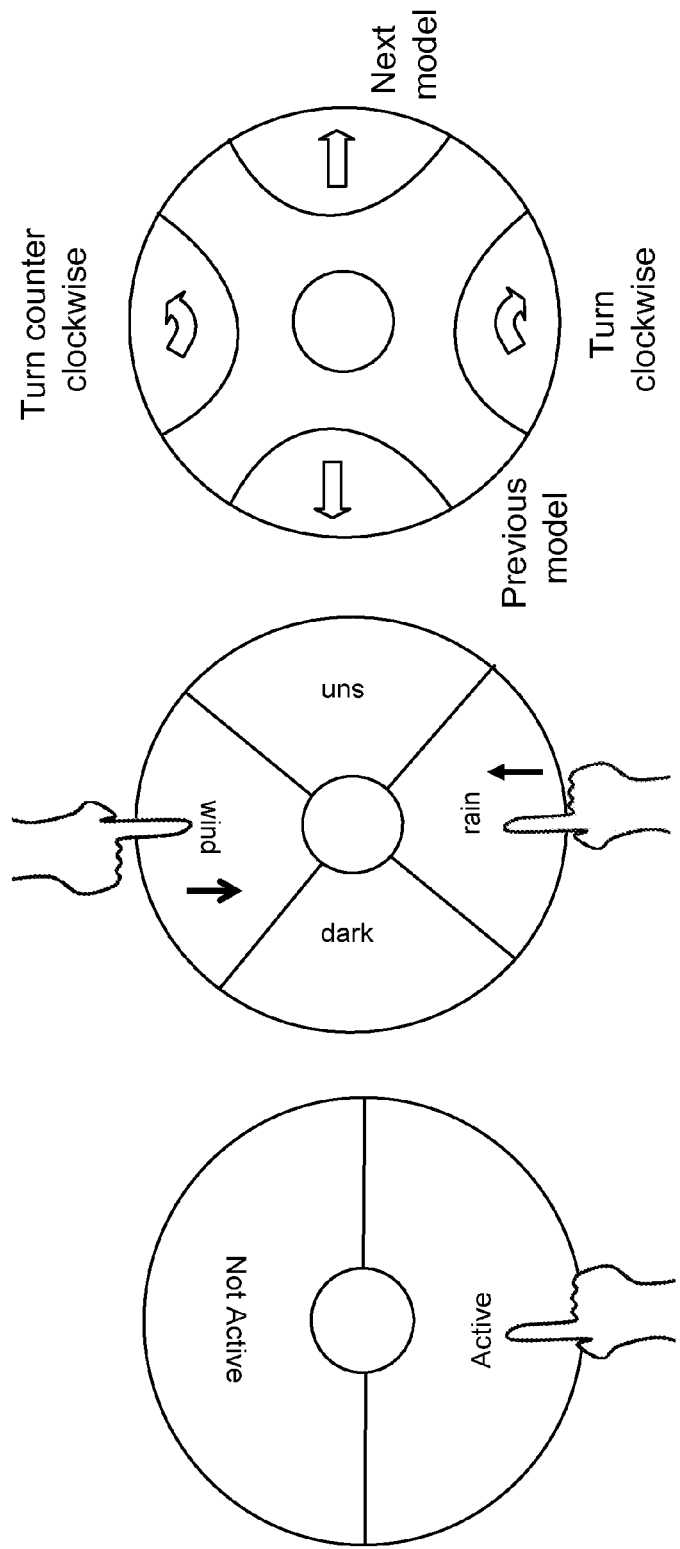

3D INTERACTIVE INPUT SYSTEM AND METHOD

FIELD OF THE INVENTION

The present invention relates generally to input systems and in particular to a three-dimensional (3D) interactive input system.

BACKGROUND OF THE INVENTION

Interactive input systems that allow users to inject input such as for example digital ink, mouse events etc. into an application program using an active pointer (e.g. a pointer that emits light, sound or other signal), a passive pointer (e.g. a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001, all assigned to SMART Technologies ULC of Calgary, Alberta, Canada, assignee of the subject application, the entire contents of which are incorporated herein by reference; touch systems comprising touch panels employing electromagnetic, capacitive, acoustic or other technologies to register pointer input; tablet personal computers (PCs); laptop PCs; personal digital assistants (PDAs) and other handheld devices; and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital cameras at its four corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are then conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

Such interactive input systems have typically made use of two-dimensional display surfaces. For example, in the case of the touch system described in above-incorporated U.S. Pat. No. 6,803,906 to Morrison et al., the bezel is configured to surround a flat panel display device such as a liquid crystal display (LCD) panel or plasma display panel. More recently, display systems for generating three-dimensional images have been considered. For example, U.S. Pat. No. 7,293,881 to Kasahara discloses a video projector that projects an image without reducing the resolution, onto a full dome surface. The video projector has a single-eye fisheye lens for projecting combined beams of light from a plurality of image display devices onto the dome surface.

U.S. Pat. No. 7,352,340 to Utt et al. discloses a display system comprising a display surface having a 3D convex shape. A projection unit projects images onto the display surface. The projection unit has a lens system with a convex shape that is designed to match the convex shape of the display surface such that an image can be displayed on the 3D display surface.

Display technology for displaying 3D images that makes use of holography has also been considered. OPTI-GONE International, Inc. of Ojai, Calif. has developed a holographic display offered under the name Mirage™ Model 22 Gigantic 3D Hologram Maker (http://www.optigone.com/m22.htm). FIG. 1 shows a schematic view of the Mirage™ 3D Hologram Maker 20. As can be seen, the 3D Hologram Maker 20 comprises a pair of opposing parabolic mirrors 22 and 24 that define an enclosed space 26 therebetween. An opening 28 is provided in parabolic mirror 24 at its concave center. When an object A is placed at the concave center of parabolic mirror 22, a holographic image A' of object A that appears as a solid object projects through the opening 28.

U.S. Patent Application Publication No. 2010/0023895 to Benko et al. discloses a 3D interactive system comprising a curved display that is monitored to detect touch input on an object. FIG. 2 shows a schematic view of the Benko et al. 3D interactive system 30. As can be seen, the 3D interactive system 30 comprises a projector 32 projecting images through a wide-angle (fisheye) lens 34, into a diffuse ball 36. The 3D interactive system 30 also includes sensing components comprising an illumination ring 38 made of infrared (IR) light emitting diodes (LEDs) positioned at the bottom of diffuse ball 36, a cold mirror 40 positioned below the wide-angle lens 34, an IR pass filter 42 and an IR camera 44. An IR cut filter (not-shown) is positioned on the projector 32. Interactions on diffuse ball 36 are observed by the IR camera 44, and the projected images are updated accordingly.

Although 3D interactive input systems have been considered, improvements are sought. It is therefore an object of the present invention to provide a novel 3D interactive input system and method.

SUMMARY OF THE INVENTION

Accordingly, in one aspect there is provided a three-dimensional (3D) interactive input system comprising a holographic image generator defining an enclosed space to accommodate a 3D object and configured to generate a holographic image of the 3D object that appears adjacent an input region of said holographic image generator; a projection unit configured to project image data onto the 3D object, the image data projected onto the 3D object appearing on said holographic image; a sensing unit configured to detect user proximity to the input region; and processing structure configured to process sensing unit output and in response, update image data projected by the projection unit.

In one embodiment, the processing structure processes sensing unit output to recognize user input gestures and in response, updates image data projected by the projection unit. The user input gestures may comprise at least one of finger movement, hand movement and fist movement adjacent the input region. The processing unit updates image data projected by the projection unit such that the holographic image is manipulated in a manner consistent with user movement adjacent the input region.

In one form, the holographic image generator comprises a pair of opposing, generally concave mirrors having facing reflective surfaces and defining the enclosed space therebetween. The 3D object is positioned adjacent the center of one of the mirrors. The other of the mirrors has an opening therein adjacent the center thereof in which the holographic image appears. The opening defines the input region. In one form, the projection unit comprises a projector and at least one lens element. The at least one lens element receives image data projected by the projector and directs the image data onto the surface of the 3D object. The image data may represent texture on the 3D object.

In one embodiment, the sensing unit comprises at least one imaging device having a field of view encompassing the input region. The processing structure in this case is configured to process image frames captured by the at least one imaging device. In another embodiment, the sensing unit may comprise a plurality of sensors positioned about the perimeter of the input region.

The 3D interactive input system may further comprise a 3D object positioning unit configured to position the 3D object in the enclosed space. The 3D object positioning unit may be configured to support a plurality of 3D objects and may be actuable to position a selected one of the 3D objects in the enclosed space.

According to another aspect there is provided a method comprising projecting image data onto a 3D object positioned within a holographic image generator, the projected image data appearing on a holographic image of the 3D object generated by said holographic image generator; detecting user input gestures made proximate the holographic image; and updating the image data projected on the 3D object based on detected user input gestures, thereby to manipulate the holographic image.

In one embodiment, the detecting comprises capturing image frames of an input region adjacent the holographic image and processing the captured image frames to recognize user input gestures. In another embodiment, the detecting comprises detecting user proximity and movement adjacent an input region proximate the holographic image to recognize user input gestures.

BRIEF DESCRIPTION OF THE DRAWINGS

Embodiments will now be described more fully with reference to the accompanying drawings in which:

FIGS. 18A to 18C show exemplary projected image data.

DETAILED DESCRIPTION OF THE EMBODIMENTS

In the following, a three-dimensional (3D) interactive input system and method are described. The 3D interactive input system comprises a holographic image generator defining an enclosed space to accommodate a 3D object and configured to generate a holographic image of the 3D object that appears adjacent an input region of the holographic image generator. A projection unit is configured to project image data onto the 3D object, the image data projected onto the 3D object appearing on the holographic image. A sensing unit is configured to detect user proximity to the input region and processing structure is configured to process sensing unit output and in response, update image data projected by the projection unit. Embodiments of the 3D interactive input system will now be described with particular reference to FIGS. 3 to 17C.

Figure 1:
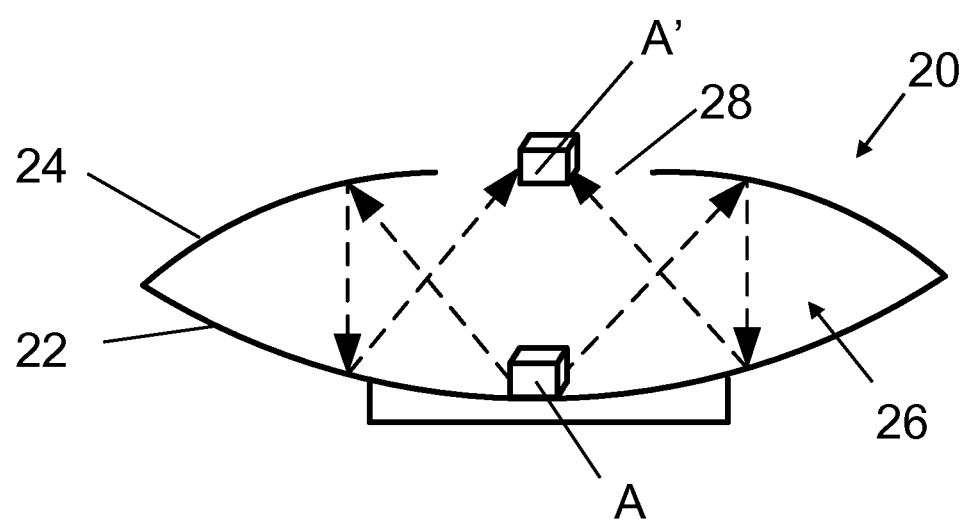
FIG. 1 is a schematic view of a prior art 3D Hologram Maker.
Figure 2:
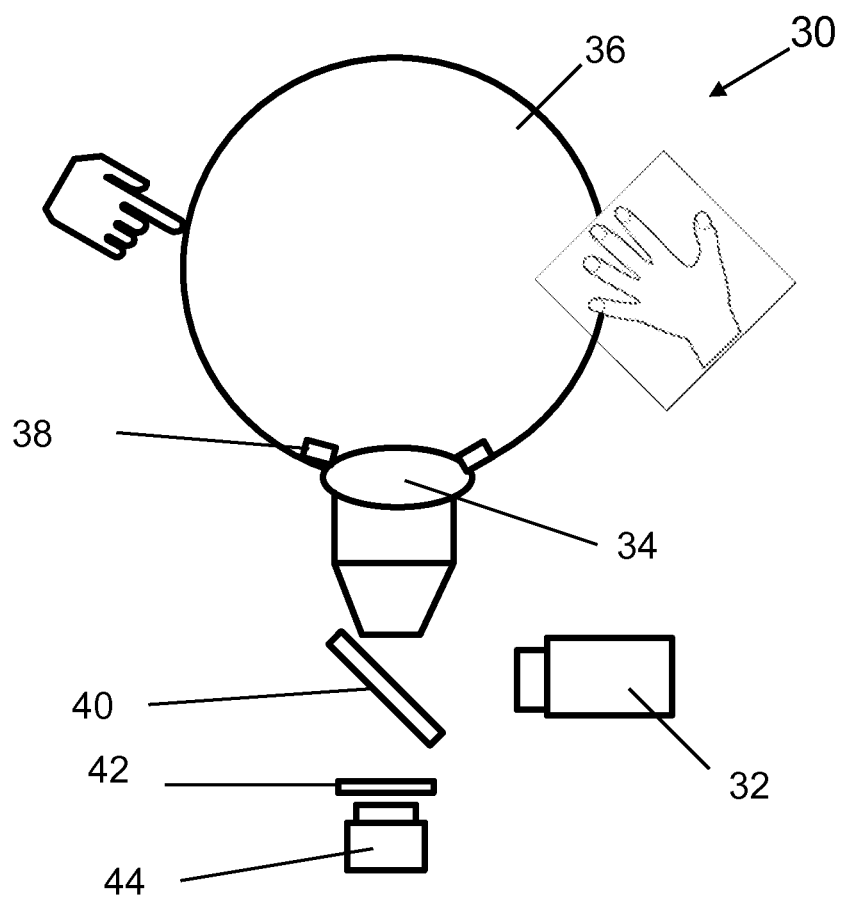
FIG. 2 is a schematic view of a prior art 3D interactive system.
Figure 3:
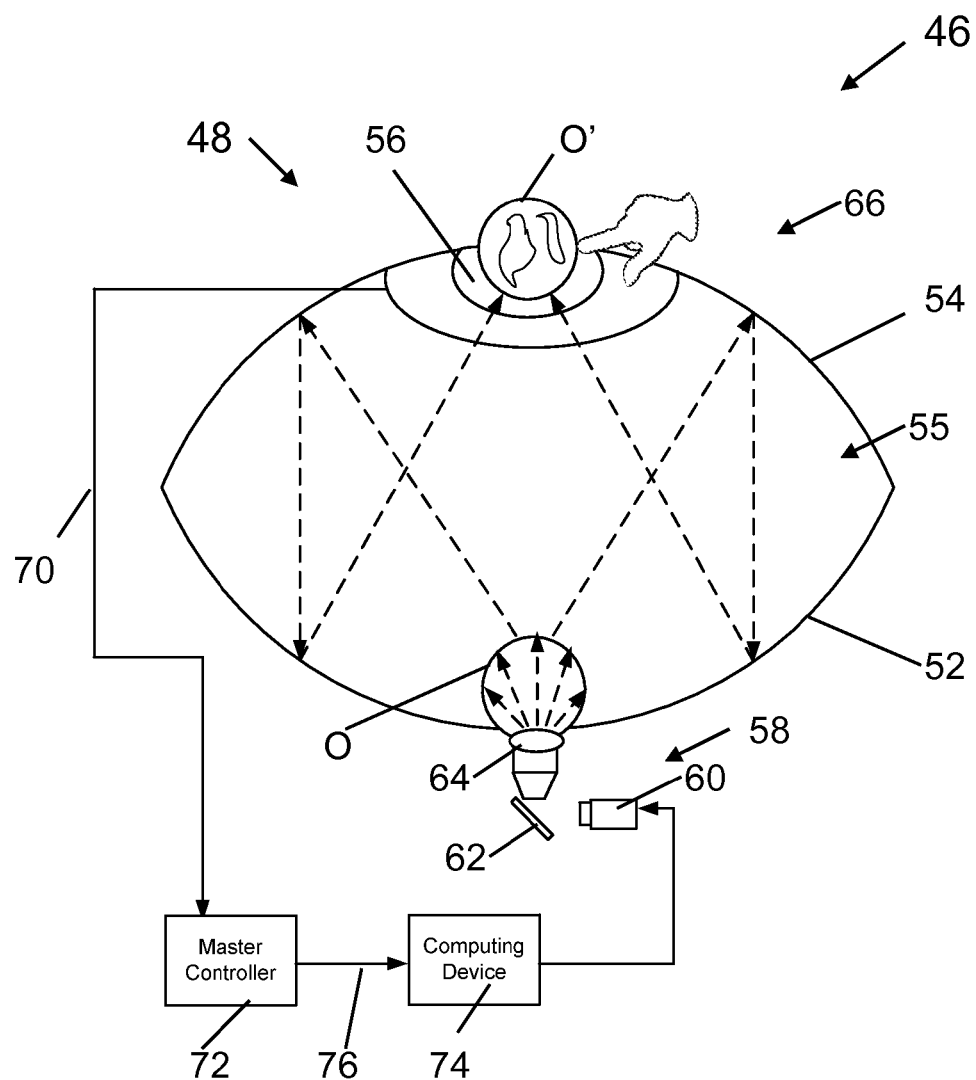
FIG. 3 is a schematic view of a 3D interactive input system in accordance with the subject application.

Turning now to FIG. 3, a 3D interactive input system that allows a 3D holographic image to be manipulated to reflect gesture activity performed by a user is shown and is generally identified by reference numeral 46. As can be seen, 3D interactive input system 46 comprises a holographic image generator 48 configured to accommodate a 3D object and generate a holographic image of the 3D object. In this embodiment, holographic image generator 48 comprises pair of opposing, generally concave mirrors 52 and 54 having facing reflective surfaces and that define an enclosed space 55 therebetween. An opening 56 is provided in the concave mirror 54 at its center. When a 3D object O, in this example a plastic sphere as shown, is positioned within the enclosed space 55 at the center of concave mirror 52, a holographic image O' of the 3D object O appears adjacent an input region of the holographic image generator 48 defined by the opening 56.

A projection unit 58 is positioned below the concave mirror 52, and is configured to project image that is directed onto the surface of the 3D object O, such that the holographic image O' appears as a combination of the 3D object O and the projected image data. In this embodiment, the image data is used to represent texture on the 3D object. The projection unit 58 comprises a projector 60 projecting image data onto an optical element in the form of a mirror 62. The mirror 62 is oriented to reflect the projected image data through a lens element in the form of a fisheye lens 64 adjacent an opening or window provided in the concave mirror 52 at its center. The fisheye lens 64 in turn directs the image data onto the outer surface of the 3D object O.

A sensing unit 66 is positioned adjacent the input region defined by the opening 56, and is configured to generate output in response to user proximity to the input region. In particular, the sensing unit 66 is configured to detect gesture activity performed by a user within the input region such as when the user interacts with the holographic image O'. The sensing unit 66 provides generated output to a master controller 72 over a communication link 70. The communication link 70 may take the form of a serial bus, a parallel bus, a universal serial bus (USB), an Ethernet connection or other suitable wired connection. Alternatively, the communication link 70 may take the form of a wireless connection that uses a suitable wireless protocol such as for example Bluetooth, WiFi, ZigBee, ANT, IEEE 802.15.4, Z-Wave, etc.

The master controller 72 processes the output of the sensing unit 66 to determine the approximate position of a user's hand or fingers used to perform a gesture within the input region defined by the opening 56 and communicates resultant gesture position data to a general purpose computing device 74 over a USB cable 76. Alternatively, the master controller 72 may communicate with the general purpose computing device 74 over another wired connection such as for example, a parallel bus, an RS-232 connection, an Ethernet connection etc. or may communicate with the general purpose computing device 74 over a wireless communication using a suitable wireless protocol such as for example Bluetooth, WiFi, ZigBee, ANT, IEEE 802.15.4, Z-Wave, etc.

General purpose computing device 74 in this embodiment is a personal computer or other suitable processing device or structure executing one or more applications programs. Thus, general purpose computing device 74 comprises, for example, a processing unit, system memory (volatile and/or non-volatile), other non-removable and removable memory (e.g. a hard disk drive, RAM, ROM, EEPROM, CD-ROM, DVD, flash memory, etc.) and a system bus coupling the various components to the processing unit. The general purpose computing device 74 may also comprise a network connection to access shared or remote devices, one or more networked computing devices, and/or other network devices. The general purpose computing device 74 processes the gesture position data received from the master controller 72 by comparing the received gesture position data to previously received gesture position data to identify the gesture movement. The general purpose computing device 74 in turn updates the image data that is output to the projection unit 58, if appropriate, such that the holographic image O' is manipulated based on the gesture activity performed by the user.

The general operation of the 3D interactive input system 46 will now be described. Initially, a user places a 3D object O to be hologrammed within the enclosed space 55 at the center of concave mirror 52 and the projection unit 60 is operated so that image data is projected onto the outer surface of the 3D object O. The facing reflective surfaces of the concave mirrors 52 and 54 create a holographic image O' of the 3D object, including the image data projected on the 3D object, that appears at the input region defined by the opening 56. The sensing unit 66 monitors gesture activity performed by a user within the input region, and in response to gesture activity, generates output that is sent to the master controller 72 for processing. The master controller 72 samples and processes the output of the sensing unit 66 to recognize gesture activity and generate resultant gesture position data. The gesture position data is then sent to the general purpose computing device 74 for processing. The general purpose computing device 74 processes the gesture position data received from the master controller 72 by comparing the received gesture position data to previously received gesture position data to identify gesture movement. If gesture position data has not been previously received by the general purpose computing device 74, the received gesture position data is identified as the beginning of a gesture. In response to the gesture position data and the comparison results, the general purpose computing device 74 updates the image data that is output to the projection unit 58, if appropriate, such that the holographic image O' is manipulated based on the gesture activity performed by the user.

Figure 4:
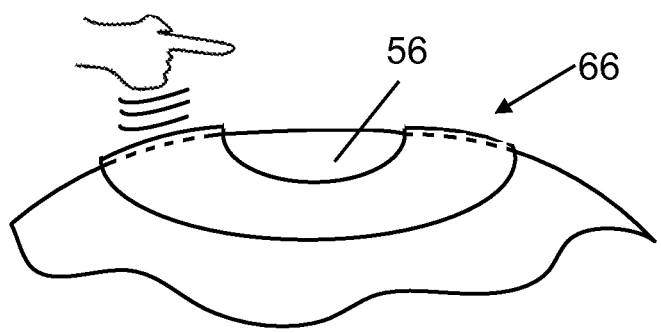
FIG. 4 is an elevation view of a sensing unit forming part of the 3D interactive input system of FIG. 3.
Figure 5:
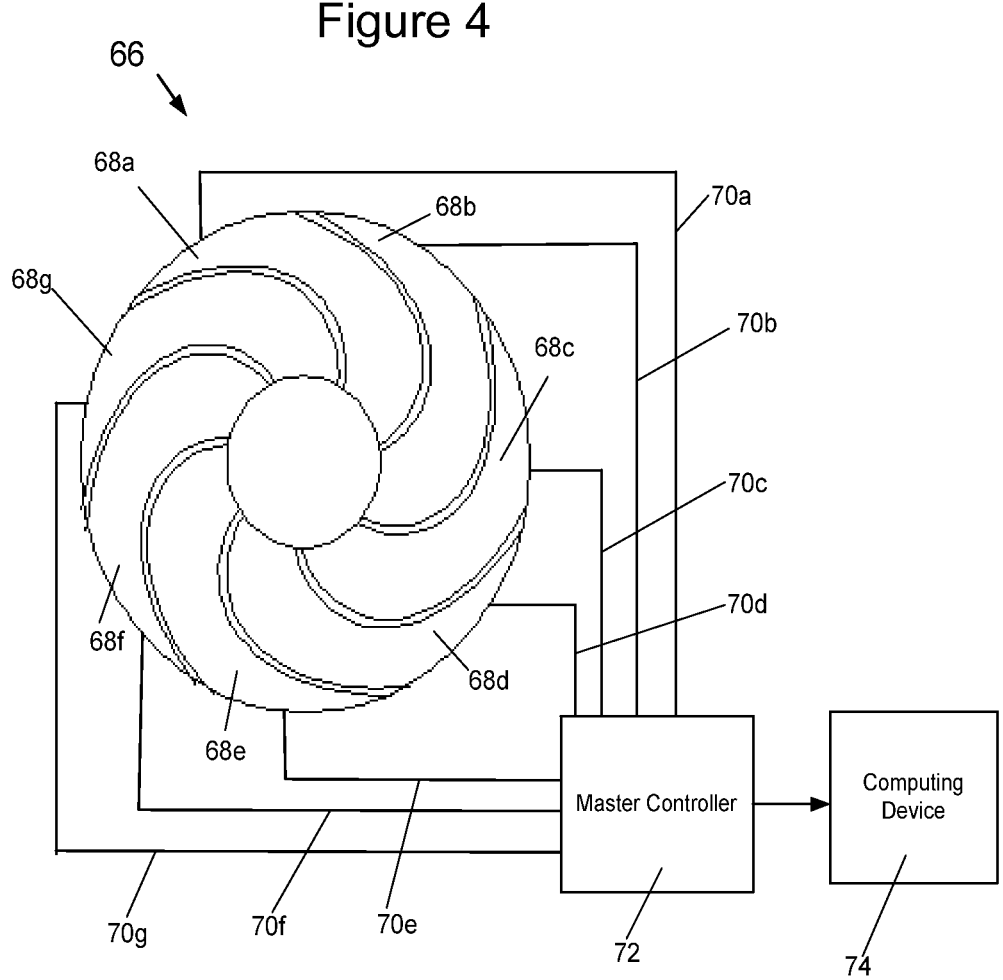
FIG. 5 is a schematic view of the sensing unit of FIG. 4.

Turning now to FIGS. 4 and 5, the sensing unit 66 is better illustrated. In this embodiment, the sensing unit 66 comprises a plurality of capacitive sensors 68a to 68g. As can be seen, the capacitive sensors 68a to 68g are positioned about the perimeter of the input region defined by the opening 56 and are oriented in a spiral pattern such that a user's finger will be sensed by at least two of the capacitive sensors 68a to 68g when brought into proximity with the sensing unit 66 and a user's hand will be sensed by substantially all of the capacitive sensors 68a to 68g in the event the user performs a gesture with their entire hand or fist. As will be appreciated, the spiral patterns of the capacitive sensors allow for sub-sensor resolution by providing a percentage delta of detection from one capacitive sensor to adjacent capacitive sensors. The capacitive sensors 68a to 68g are covered with a thin sheet of insulating material (not shown) to decouple the capacitive sensors 68a to 68g from the concave mirrors 52 and 54. The capacitive sensors 68a to 68g are connected to the master controller 72 via communication lines 70a to 70g forming the communication link 70.

In this embodiment, the output generated by the sensing unit 66 in response to a user gesture comprises a plurality of output waveforms, with each waveform being generated by a respective capacitive sensor. The intensity value of each output waveform at a given time is representative of the distance between the capacitive sensor generating the output waveform and a user's finger or hand positioned above the capacitive sensor.

Figure 6:
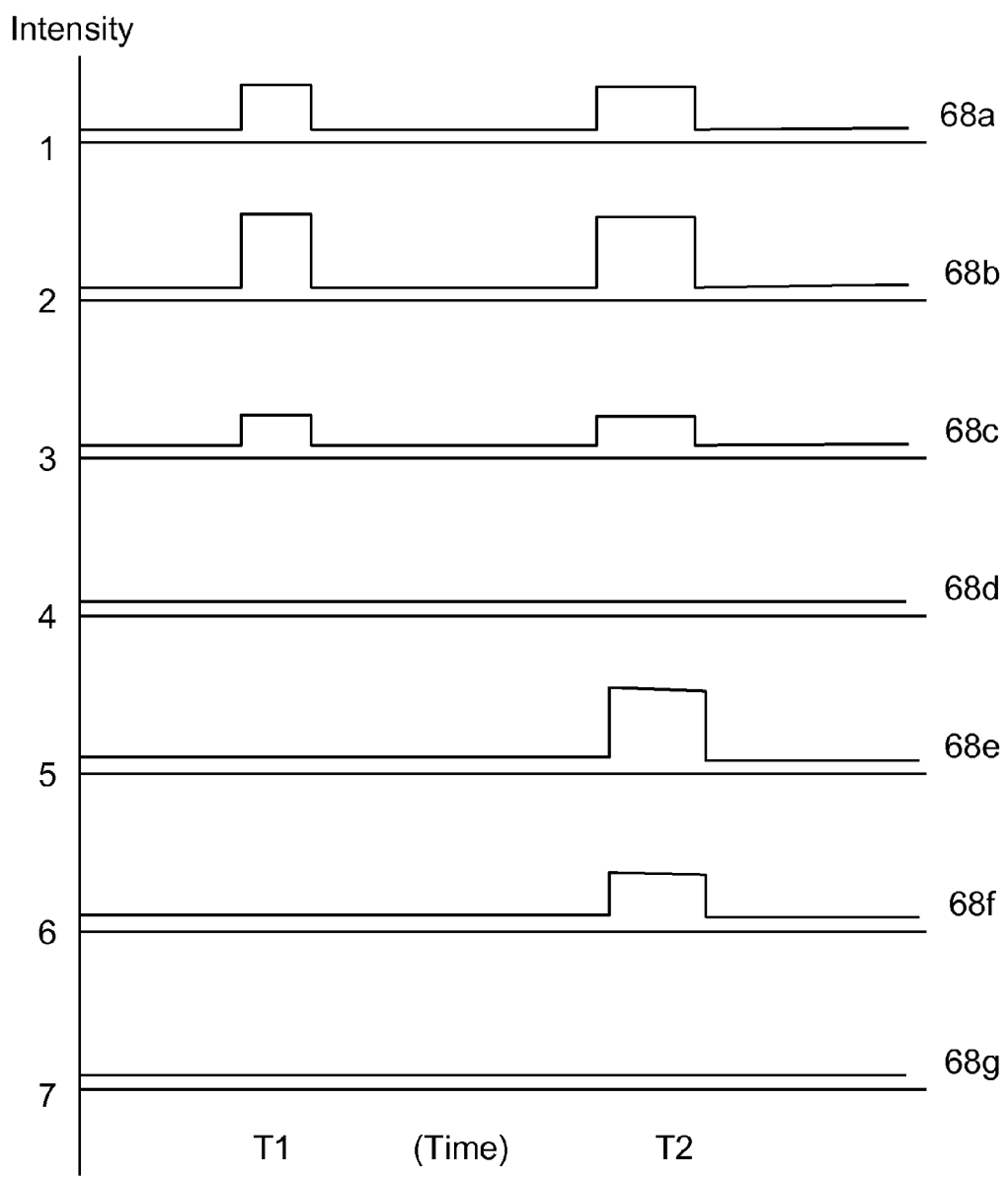
FIG. 6 shows exemplary sampled output waveforms generated by the sensing unit of FIG. 4.

FIG. 6 shows exemplary output waveforms generated by the capacitive sensors 68a to 68g, in response to a gesture performed by a user, that have been sampled by the master controller 72. As can be seen, prior to time T1, no gesture is being made by a user adjacent the sensing unit 66 and as a result, the intensity value of the sampled output waveform generated by each capacitive sensor is substantially equal to zero (0). At time T1, a gesture is made by the user by first bringing a finger into proximity with the capacitive sensors 68a, 68b and 68c of sensing unit 66. As a result, the intensity values of the sampled output waveforms generated by capacitive sensors 68a, 68b, and 68c indicate detection of the finger in proximity therewith. The sampled output waveform having the greatest intensity value is generated by capacitive sensor 68b, which indicates that the position of the finger is closest to capacitive sensor 68b. At time T2, the sampled output waveforms generated by capacitive sensors 68a, 68b, and 68c continue to indicate detection of the first finger. However, at time T2, the user has brought another finger into proximity with the capacitive sensors 68e and 68f of the sensing unit 66. As a result, the intensity values of the sampled output waveforms generated by capacitive sensors 68e and 68f indicate the detection of the second finger in proximity therewith. The sampled output waveform having the greatest intensity value is output by capacitive sensor 68e, which indicates that the position of the second finger is closest to capacitive sensor 68e.

Figure 7:
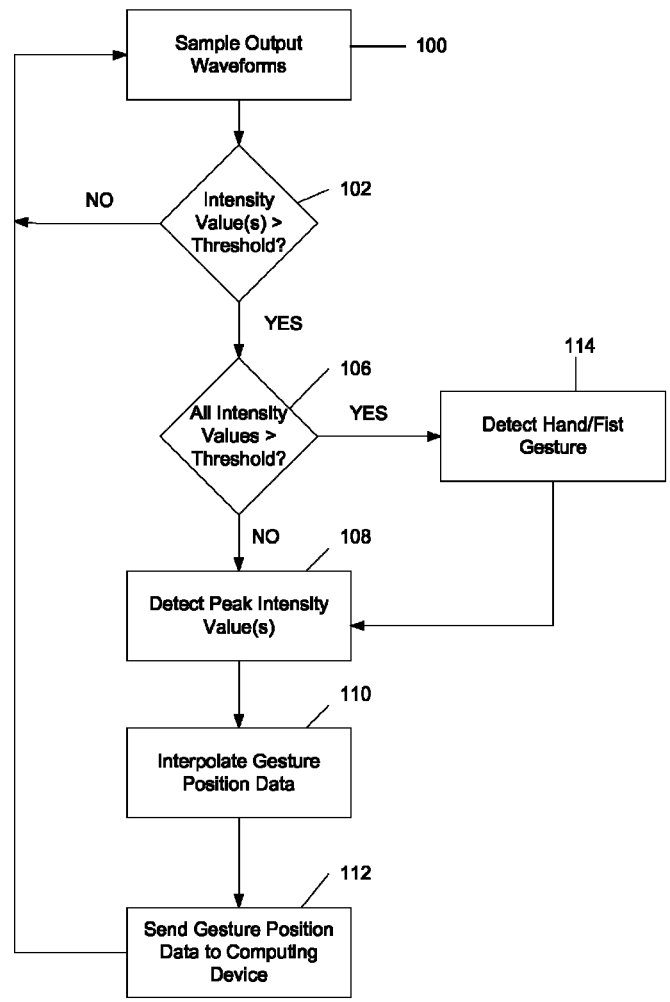
FIG. 7 is a flowchart showing steps performed during processing of sampled output waveforms generated by the sensing unit of FIG. 4.

FIG. 7 is a flowchart showing the steps performed during processing of the output waveforms generated by the sensing unit 66. As mentioned above, the output waveforms generated by the capacitive sensors 68a to 68g of the sensing unit 66 and applied to the communication link 70 are sampled by the master controller 72 at intervals (step 100). At each sampling interval, the master controller 72 examines the intensity value of each sampled output waveform to determine if its intensity value is greater than a threshold level (step 102). If none of the output waveforms has an intensity value above the threshold level (a condition represented in FIG. 6 prior to time T1), the master controller 72 determines that no user gesture is being performed, the sampled output waveforms are ignored and the process reverts to step 102.

At step 102, if the intensity value of one or more of the sampled output waveforms has an intensity value greater than the threshold level, the master controller 72 determines that a user gesture is being performed. In this case, the master controller 72 performs a check to determine if all of the sampled output waveforms have an intensity value greater than the threshold level (step 106). If only some of the sampled output waveforms have an intensity value greater than the threshold level, the master controller 72 compares the intensity value of each of these sampled output waveforms to its adjacent sampled output waveforms in order to determine differences in intensity values and hence the proximity of the user's finger(s) to individual capacitive sensors (step 108).

Turning back to the sampled output waveforms shown in FIG. 6 for example, at time T1, the master controller 72 determines that the sampled output waveforms generated by capacitive sensors 68 to 68*c* have intensity values greater than the threshold level. As a result, the master controller 72 compares each sampled output waveform to its adjacent sampled output waveforms to determine the sampled output waveform that has the highest peak intensity value. In this case, master controller 72 compares the intensity value of the sampled output waveform generated by the capacitive sensor 68*a* with the intensity value of the sampled output waveforms generated by capacitive sensors 68*b* and 68*g*, compares the intensity value of the sampled output waveform generated by the capacitive sensor 68*b* with the intensity value of the sampled output waveforms generated by capacitive sensors 68*a* and 68*c* and compares the intensity value of the sampled output waveform generated by the capacitive sensor 68*c* with the intensity value of the sampled output waveforms generated by capacitive sensors 68*b* and 68*d*. Since the intensity value of the sampled output waveform generated by capacitive sensor 68*b* is greater than the intensity values of the sampled output waveforms generated by the capacitive sensors 68*a* and 68*c*, the master controller 72 also determines that the intensity value of the sampled output waveform generated by capacitive sensor 68*b* is the peak intensity value. As only adjacent capacitive sensors 68*a* and 68*c* generate sampled output waveforms having intensity values greater than the threshold level, the master controller 72 determines that only one peak intensity value is present at time T1, and thus that only one finger is positioned proximate the sensing unit 66. The master controller 72 then calculates the position of the finger using the peak intensity value along with the intensity values of the sampled output waveforms generated by the neighbouring capacitive sensors that are above the threshold level (in this example capacitive sensors 68*a* and 68*c*). Using these intensity values, the position of the finger is interpolated by the master controller 72 into a radial and height value referred to as gesture position data (step 110). The resultant gesture position data is then sent to the general purpose computing device 74 (step 112). As this is the first gesture position data received by the general purpose computing device 74, the general purpose computing device 74 recognizes the gesture position data as the beginning of a gesture.

At time T2, the master controller 72 again determines that the intensity values of some sampled output waveforms generated by capacitive sensors are above the threshold level (in this case capacitive sensors 68*a*, 68*b*, 68*c*, 68*e* and 68*f*) and thus, compares each of these sampled output waveforms to the sampled output waveforms generated by adjacent capacitive sensors to determine if the sampled output waveforms represent peak intensity values. For example, master controller 72 compares the intensity value of the sampled output waveform generated by the capacitive sensor 68*a* with the intensity value of the sampled output waveforms generated by capacitive sensors 68*b* and 68*g*, compares the intensity value of the sampled output waveform generated by capacitive sensor 68*b* with the intensity value of the sampled output waveforms generated by capacitive sensors 68*a* and 68*c* and compares the intensity value of the sampled output waveform generated by the capacitive sensor 68*c* with the intensity value of the sampled output waveforms generated by capacitive sensors 68*b* and 68*d*. The master controller 72 also compares the intensity value of the sampled output waveform generated by the capacitive sensor 68*e* with the intensity value of the sampled output waveforms generated by capacitive sensors 68*d* and 68*f* and compares the intensity value of the sampled output waveform generated by the capacitive sensor 68*f* with the intensity value of the sampled output waveforms generated by capacitive sensors 68*e* and 68*g*. Since the intensity value of the sampled output waveform generated by capacitive sensor 68*b* is greater than the intensity values of the sampled output waveforms generated by the capacitive sensors 68*a* and 68*b*, the master controller 72 determines that the intensity value of the sampled output waveform generated by capacitive sensor 68*b* is a peak intensity value. As sampled output waveforms having intensity values greater than the threshold level are generated by groups of spaced capacitive sensors, the master controller 72 also determines that the intensity value of the sampled output waveform generated by capacitive sensor 68*e* is also a peak intensity value. Since the master controller 72 identifies two peak intensity values, and the two capacitive sensors 68*b* and 68*e* associated with the two peak intensity values are separated from one another by at least one other capacitive sensor, the master controller 72 determines that two fingers are present. The master controller 72 then calculates the positions of the fingers using the peak intensity values along with the intensity values of the sampled output waveforms generated by neighbouring capacitive sensors that have intensity values above the threshold level. Using the intensity values, the position of each finger is interpolated into a radial and height value. The resultant gesture data is then sent to the general purpose computing device 74. The general purpose computing device 74 processes the gesture position data by comparing the received gesture position data to the previously received gesture position data (corresponding to the gesture position data received at time T1) to identify the gesture movement. The general purpose computing device 74 compares the gesture movement to a gesture library to recognize the gesture being performed and in turn updates the image data that is output to the projection unit 58, if appropriate, such that the holographic image O' is manipulated based on the gesture activity performed by the user proximate to the input region defined by opening 56.

At step 106, if the master controller 72 detects that all of the sampled output waveforms have an intensity value greater than the threshold level, the master controller 72 determines that the user has performed a gesture user their entire hand or fist (step 114). In this case, the master controller 72 compares the intensity values of the sampled output waveforms to determine whether any peak intensity values exist (step 108). The master controller 72 uses the peak intensity values, if any, and the other intensity values to interpolate the position of the user's hand or fist into radial and height values (step 110). The resultant gesture position data is then sent to the general purpose computing device 74 for processing as described above (step 112) and the process reverts to step 100.

In this embodiment, the gesture library maintained by the general purpose computing device 74 comprises a number of gestures allowing the 3D holographic image to be manipulated through performance of a variety of gestures adjacent the input region and hence, the holographic image O'. For example, if the user performs a pinching motion adjacent the holographic image O' using two fingers, the image data conveyed to the projection unit 58 is adjusted to create a zooming out effect. Moving the fingers in the opposite direction results in the image data conveyed to the projection unit 58 being adjusted to create a zooming in effect. The image data projected on the 3D object image may be rotated when the user performs a gesture by making a spinning motion with two of their fingers. The image data projected on the 3D object may be moved vertically when the user performs a gesture by making a grasping motion with two of their fingers. The image data projected on the 3D object may be moved horizontally when the user performs a gesture by making a pushing motion with one or more of their fingers. The projected image data may be cleared when the user performs a gesture by making a downward motion with an open hand or fist. Of course, other gestures may be made to manipulate the 3D holographic image O'.

Figure 8:
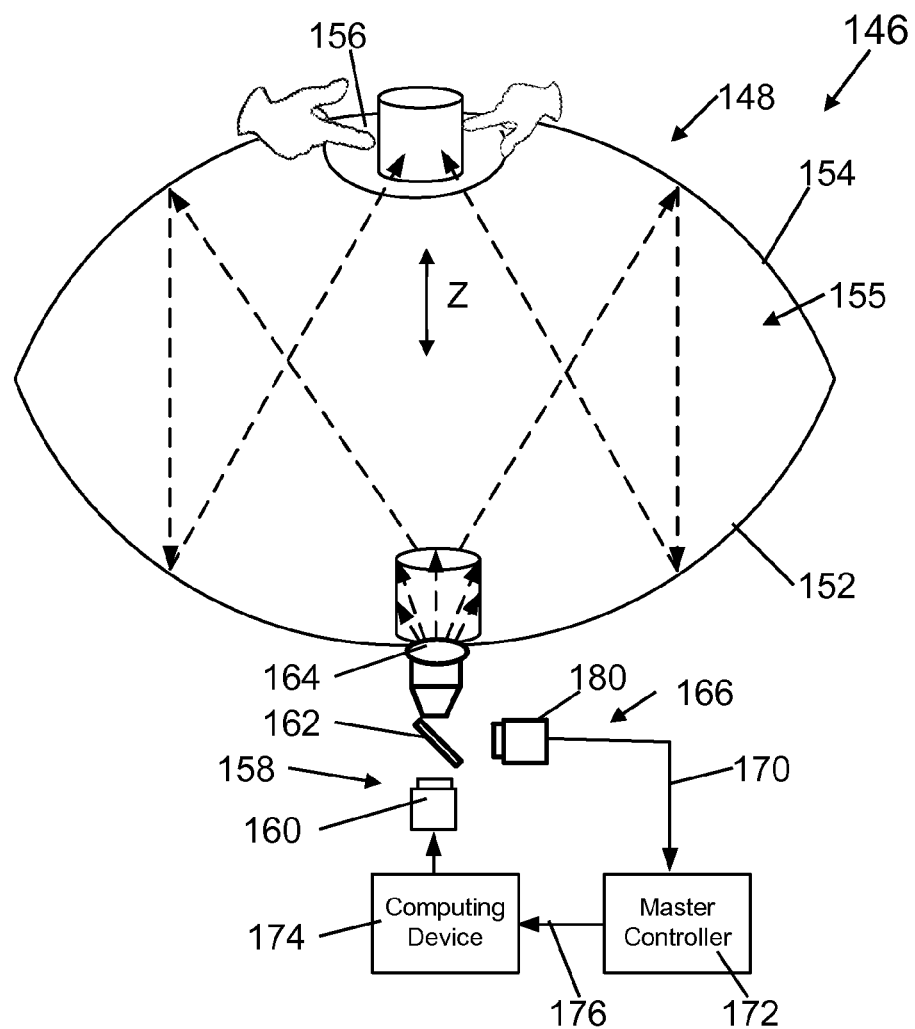
FIG. 8 is a schematic view of another embodiment of a 3D interactive input system.

Turning now to FIG. 8, another embodiment of a 3D interactive input system is shown and is generally identified by reference numeral 146. In this embodiment, like reference numerals will be used to indicate like components with a "100" added for clarity. As can be seen, 3D interactive input system 146 is similar to that of the first embodiment and comprises a holographic image generator 148 to accommodate a 3D object and generate a holographic image of the 3D object. Holographic image generator 148 comprises a pair of opposing, generally concave mirrors 152 and 154 having facing reflective surfaces and defining an enclosed space 155 therebetween. An opening 156 is provided in the concave mirror 154 at its center and defines an input region. When a 3D object O, in this example a plastic cylinder as shown, is positioned within the enclosed space 155 at the concave center of mirror 152, a holographic image O' of the 3D object O appears adjacent the input region.

A projection unit 158 is positioned below the concave mirror 152 and is configured to project image data that is directed onto the surface of the 3D object such that the holographic image O' appears as a combination of the 3D object and projected image data. The projection unit 158 in this embodiment comprises a projector 160 that is axially aligned with the center of the concave mirror 152. Image data projected by the projector 160 passes through a hot mirror 162 and a fisheye lens 163 before impinging on the 3D object O.

A sensing unit 166 is also positioned below the concave mirror 152 and comprises an IR imaging device 180 adjacent the projection unit 158. The IR imaging device 180 is aimed at the hot mirror 162. As is known to those of skill in the art, hot mirror 162 allows visible light to pass therethrough, but reflects IR light. The orientation of the hot mirror 162 redirects the field of view of the IR imaging device 180 into the enclosed space 155 via the fisheye lens 164 so that the input region defined by the opening 156 appears in image frames captured by the IR imaging device 180.

Image frames captured by imaging device 180 are communicated to the master controller 172 via communication link 170. The master controller 172 processes the captured image frames to determine gesture position data. The gesture position data is then sent to the general purpose computing device 174 and processed to recognize user input gestures as described above and the general purpose computing device 174 in turn adjusts the image data that is output to the projection unit 158, if appropriate.

Figure 9:
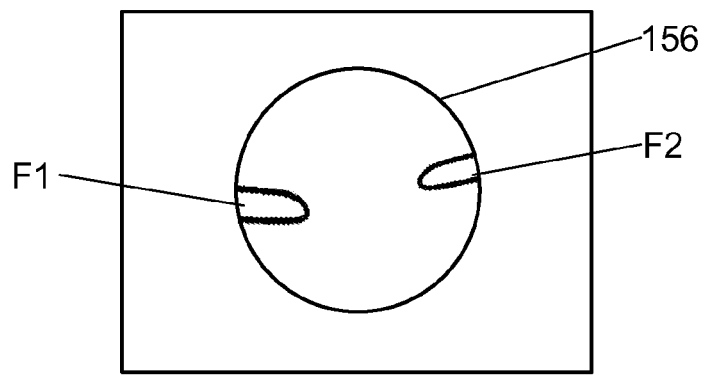
FIG. 9 shows an exemplary image captured by a sensing unit forming part of the 3D interactive input system of FIG. 8.

An exemplary image frame captured by imaging device 180 is shown in FIG. 9. As can be seen, two fingers F1 and F2 appear in the captured image frame as being in proximity with the input region defined by the opening 156. During processing of the captured image frame, master controller 172 assumes that a user's finger has a predefined width, and thus the Z-depth of fingers F1 and F2 can be calculated. Once the position and the Z-depth of fingers F1 and F2 have been calculated, the master controller 172 sends the resultant gesture position data to the general purpose computing device 174 for processing as described above.

Figure 10:
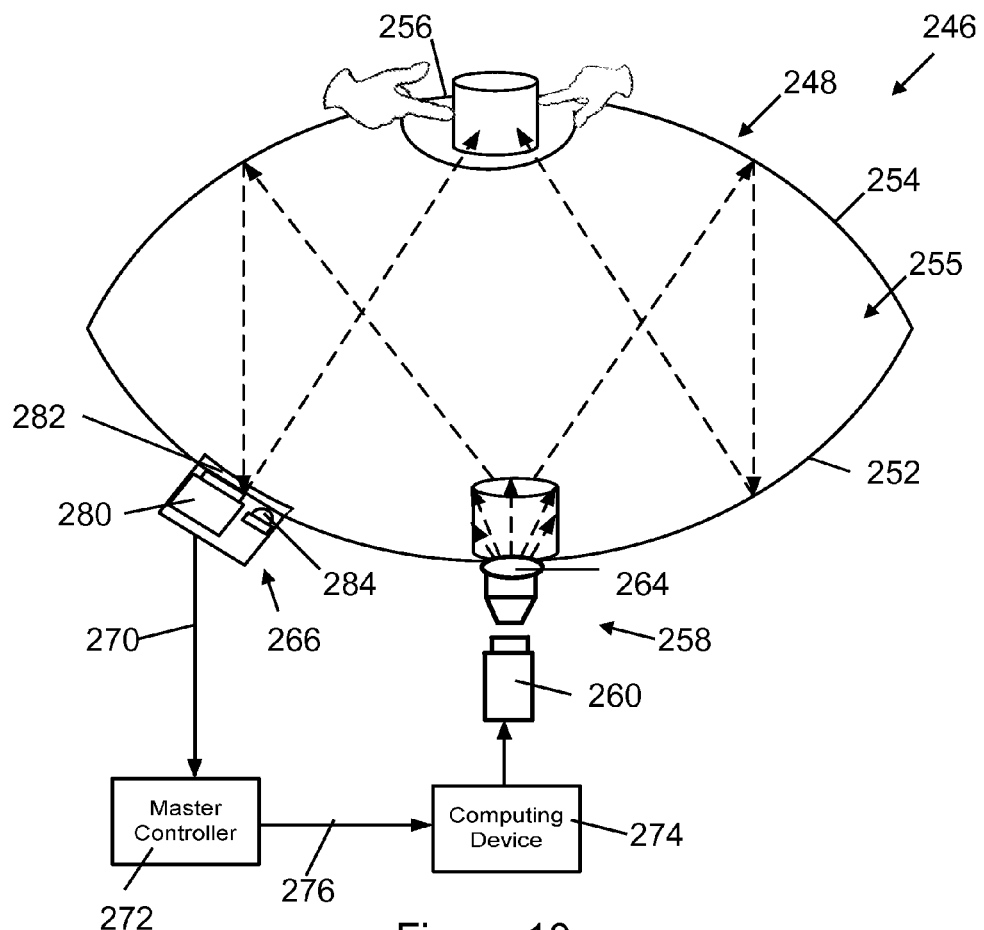
FIG. 10 is a schematic view of another embodiment of a 3D interactive input system.

Turning now to FIG. 10, another embodiment of a 3D interactive input system is shown and is generally identified by reference numeral 246. In this embodiment, like reference numerals will be used to indicate like components with a "200" added for clarity. As can be seen, 3D interactive input system 246 is similar to that of the second embodiment and comprises a holographic image generator 248 configured to accommodate a 3D object and generate a holographic image of the 3D object. Holographic image generator 248 comprises a pair of opposing, generally concave mirrors 252 and 254 having facing reflecting surfaces and defining an enclosed space 255 therebetween. An opening 256 is provided in concave mirror 254 at the center and defines an input region. When a 3D object O, in this example a plastic cylinder as shown, is positioned within the enclosed space 255 at the concave center of concave mirror 252, a holographic image O' of the 3D object O appears adjacent the input region.

A projection unit 258 is positioned below the concave mirror 252 and is configured to project image data onto the surface of the 3D object such that the holographic image O' appears as a combination of the 3D object and projected image data. The projection unit 258 in this embodiment comprises a projector 260 that is aimed directly at a fisheye lens 264 positioned at the center of the concave mirror 252. Image data projected by the projector 160 passes through the fisheye lens 264 before impinging on the 3D object O.

A sensing unit 266 is also positioned below the concave mirror 252 and comprises an imaging device 280 in the form of a range finder imaging device that is radially offset from the centre of the concave mirror 252. A cold mirror 282 integral with concave mirror 252 is positioned in front of the imaging device 280. As is known to those of skill in the art, cold mirror 282 allows IR light to pass therethrough, but reflects visible light. An IR LED 284 is positioned adjacent to imaging device 280, and is configured to provide IR illumination through the cold mirror and into the enclosed space 255.

Image frames and a 3D Z-map captured by the imaging device 280 are communicated to the master controller 272 via communication link 270. Master controller 272 processes the captured image frames and the 3D Z-map to generate gesture position data. The resultant gesture position data is then sent to the general purpose computing device 274 and processed to recognize user input gestures as described above. The general purpose computing device 274 in turn adjusts the image data that is output to the projection unit 258, if appropriate.

Figure 11:
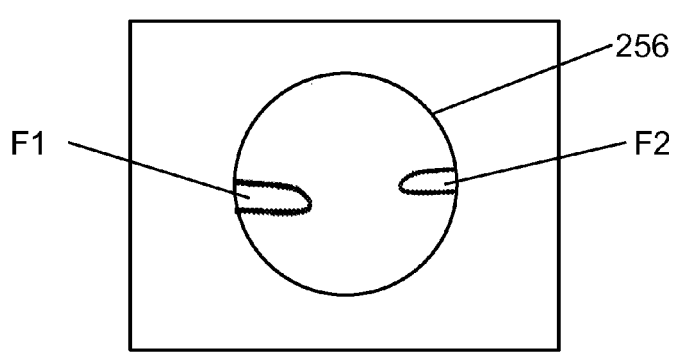
FIG. 11 shows an exemplary image captured by a sensing unit forming part of the 3D interactive input system of FIG. 10.

An exemplary image frame captured by imaging device 280 is shown in FIG. 11. As can be seen, two fingers F1 and F2 appear in the captured image frame as being in proximity with the input region defined by the opening 256. The captured image frame and 3D Z-map are processed by the master controller 272 to determine the location and the Z-depth of fingers F1 and F2 and the resultant gesture position data is sent to the general purpose computing device 274 for processing as described above.

Figure 12:
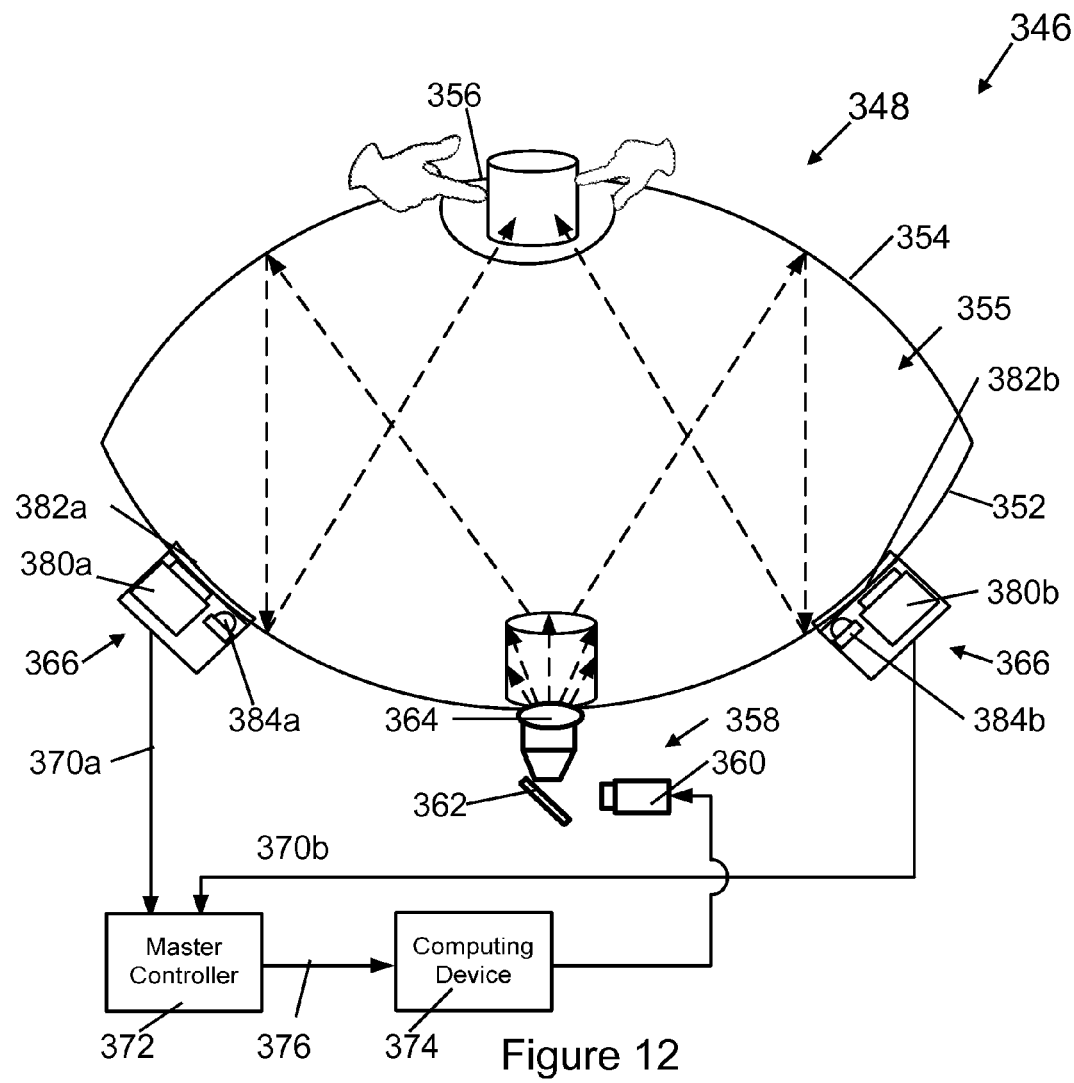
FIG. 12 is a schematic view of another embodiment of a 3D interactive input system.

Turning now to FIG. 12, yet another embodiment of a 3D interactive input system is shown and is generally identified by reference numeral 346. In this embodiment, like reference numerals will be used to indicate like components with a "300" added for clarity. As can be seen, 3D interactive input system 346 is similar to that of the second embodiment and comprises a holographic image generator 348 configured to accommodate a 3D object and generate a holographic image of the 3D object. Holographic image generator 348 comprises a pair of opposing, generally concave mirrors 352 and 354 having facing reflective surfaces and defining an enclosed space 355 therebetween. An opening 356 is provided in concave mirror 354 at its center and defines an input region. When a 3D object O is positioned within the enclosed space 355 at the concave center of concave mirror 152, a holographic image O' of the 3D object O appears at the input region.

A projection unit 358 is positioned below the concave mirror 352 and is configured to project image data that is directed onto the surface of the 3D object such that the holographic image appears as a combination of the 3D object and projected image data. The projection unit 358 in this embodiment comprises a projector 360 that is aimed directly at a mirror 362. Mirror 362 redirects the image data to a fisheye lens 364 that in turn directs the image data onto the 3D object.

A sensing unit 366 is positioned below the concave mirror 352 and comprises two IR imaging devices 380a and 380b. IR imaging devices 380a and 380b are positioned at opposite radially offset positions relative to the center of mirror 352. Each of the imaging devices 380a and 380b has a cold mirror 382a and 382b placed in front of it that is integral with the concave mirror 352. IR LEDs 384a and 384b are positioned adjacent to IR imaging devices 380a and 380b, respectively, and are configured to provide IR illumination through the cold mirrors and into the enclosed space 355.

Image frames captured by IR imaging devices 380a and 380b are communicated to the master controller 372 via communication links 370a and 370b. Master controller 372 processes the image frames captured by the IR imaging devices 380a and 380b to determine gesture position data and sends the resultant gesture position data to the general purpose computing device 374 as described above. The general purpose computing device 74 processes the gesture position data received from the master controller 372 to recognize a user input gesture and updates the image data that is output to the projection unit 358, if appropriate.

Figure 13A:
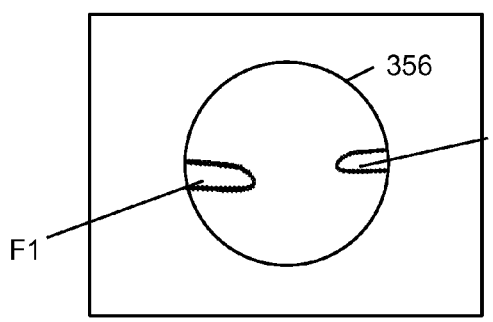
FIGS. 13A and 13B show exemplary images captured by a sensing unit forming part of the 3D interactive input system of FIG. 12.
Figure 13B:
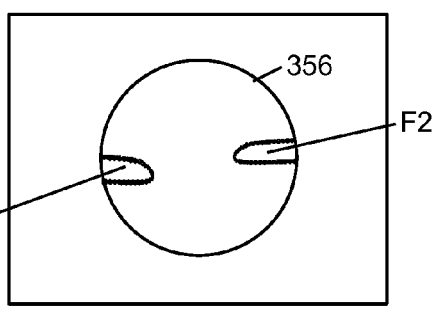

Exemplary image frames captured by IR imaging devices 380a and 380b are shown in FIGS. 13A and 13B, respectively. As can be seen, two fingers F1 and F2 are captured in both image frames as being in proximity with the input region defined by the opening 356. As will be appreciated, since the imaging devices 380a and 380b are in a fixed position, master controller 372 calculates the location of fingers F1 and F2 using triangulation. Once the locations and the Z-depths of the fingers F1 and F2 are determined, master controller 372 sends the resultant gesture position data to the general purpose computing device 374 for processing as described above.

Figure 14A:
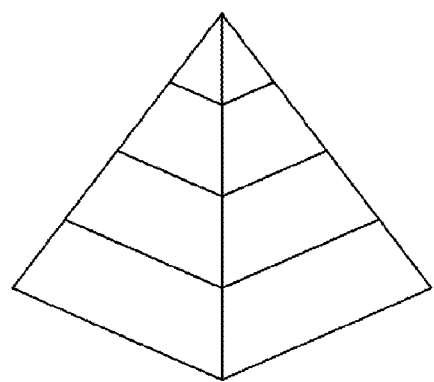
FIGS. 14A to 14H show exemplary 3D objects to be placed in the 3D interactive input systems of FIGS. 3, 8, 10 and 12.
Figure 14B:
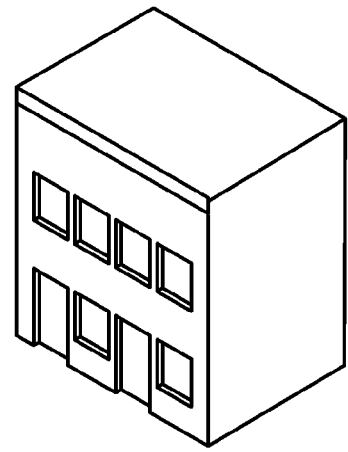
Figure 14C:
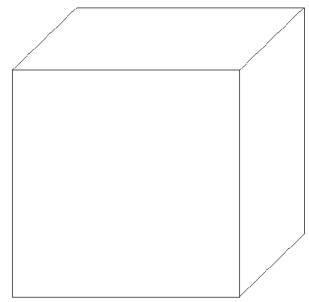
Figure 14D:
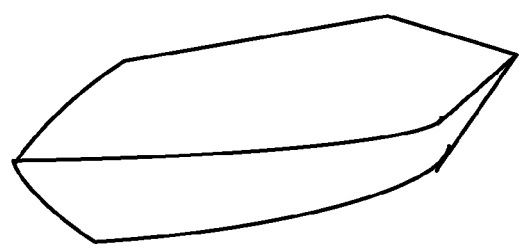
Figure 14E:
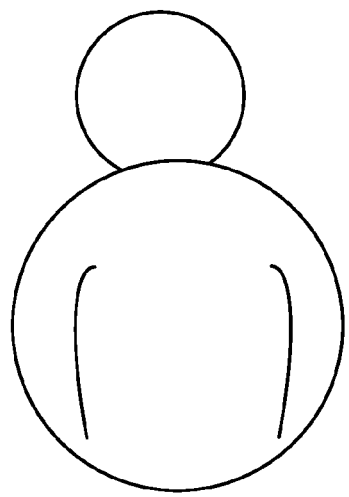
Figure 14F:
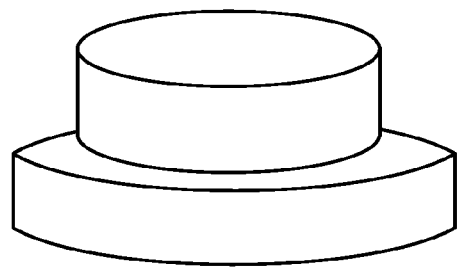
Figure 14G:
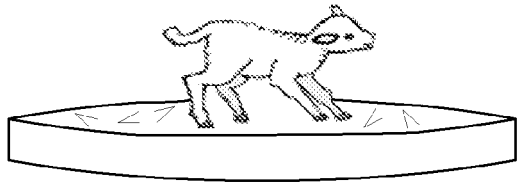
Figure 14H:
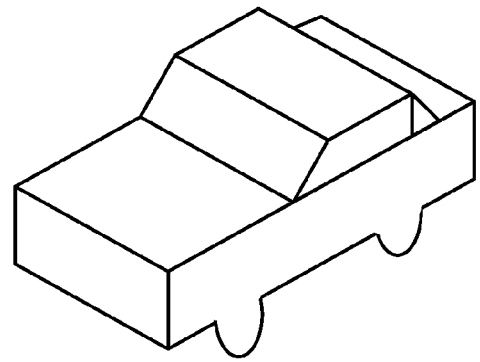

Although the 3D object O is shown and described as being either spherical or cylindrical in shape, those skilled in the art will appreciate that a 3D object of virtually any shape may be placed within the enclosed space of the holographic image generator. FIGS. 14A to 14H show other exemplary 3D objects. For example, FIG. 14A shows a pyramid. FIG. 14B shows a 3D building. FIG. 14C shows a cube. FIG. 14D shows a canoe. FIG. 14E shows a puppet. FIG. 14F shows a raised platform. FIG. 14G shows an animal figurine. FIG. 14H shows a car. As will be appreciated, the image data projected on the 3D object is typically adjusted to suit the shape of the 3D object being holographed. For example, the image data may be used to present a star at the tip of the pyramid or to present bricks on the building etc.

Figure 15:
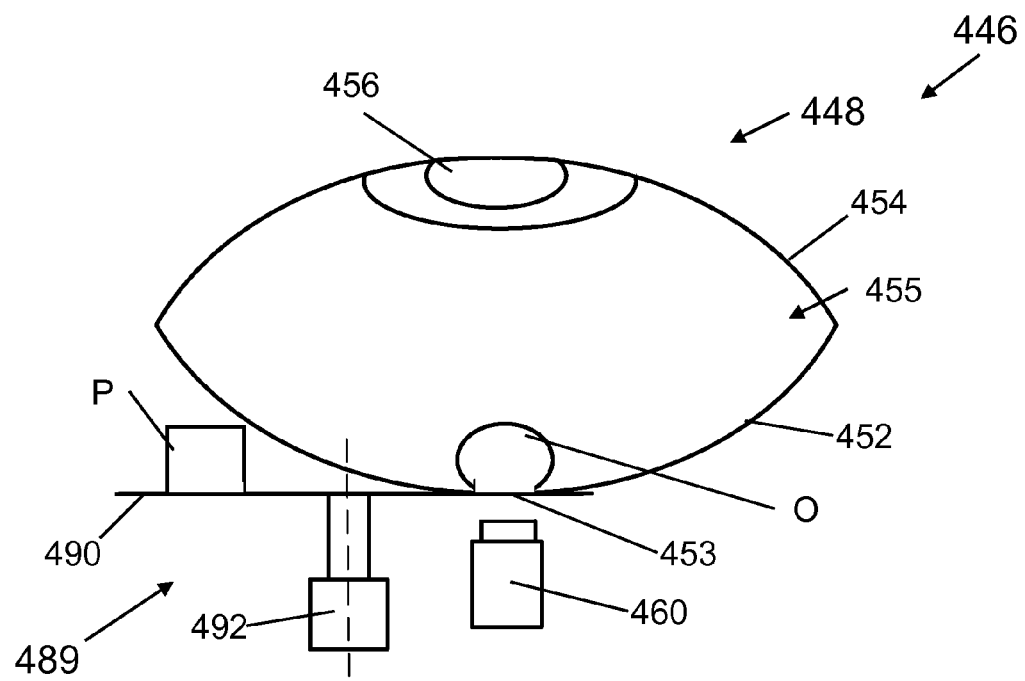
FIG. 15 is an elevation view of another embodiment of a 3D interactive input system.
Figure 16:
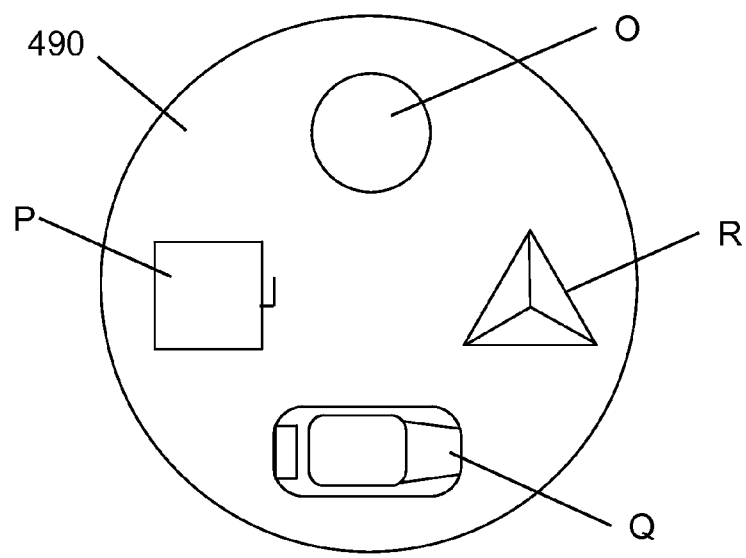
FIG. 16 shows a top view of a carousel forming part of the 3D interactive input system of FIG. 15.

In the above embodiments, a single 3D object is shown positioned at the concave center of one of the concave mirrors. In these embodiments, when it is desired to change the nature of the holographic image, the user must manually change the 3D object. FIG. 15 shows a further embodiment of a 3D interactive input system 446. In this embodiment, like reference numerals will be used to indicate like components with a "400" added for clarity. As can be seen, 3D interactive input system 446 is similar to that of the first embodiment and comprises a holographic image generator 448 configured to accommodate a 3D object and generate a holographic image of the 3D object. Holographic image generator 448 comprises a pair of opposing, generally concave mirrors 452 and 454 defining an enclosed space 455 therebetween. An opening 456 is provided at the center of concave mirror 454 and defines an input region. When a 3D object O is positioned within the enclosed space 455 at the center of concave mirror 452, a holographic image O' of the 3D object O appears at the input region.

A projection unit 460 is positioned below the concave mirror 452 and is configured to project image data onto the surface of the 3D object such that the holographic image appears as a combination of the 3D object and projected image data. The projection unit 460 in this embodiment comprises a projector 160 that is aimed directly at an opening 453 provided in the concave mirror 452 adjacent its center.

A 3D object positioning unit 489 is also positioned below the concave mirror 452. The 3D object positioning unit 489 comprises a carousel 490 supporting a plurality of 3D objects to be holographed. Carousel 490 is positioned above projector 460, and is rotatable to position a selected one of the 3D objects in alignment with opening 453 in the concave mirror 452. In this example, carousel is a circular disc that supports four (4) 3D objects O, P, Q and R shown in FIG. 16, and is connected to a dial and servo mechanism 492 that is actuable to automatically position one of the 3D objects within the enclosed spaced 455 at the center of concave mirror 452. The dial and servo mechanism 492 comprises two motors (not shown). The first motor is configured to raise carousel 490 towards mirror 452 to position one of the 3D objects through the opening 453 and into the enclosed space, or to lower carousel 490 to facilitate rotation to change the 3D object that is aligned with the opening 453. The second motor is configured to rotate the carousel 490 after it has been lowered by the first motor.

Figure 17A:
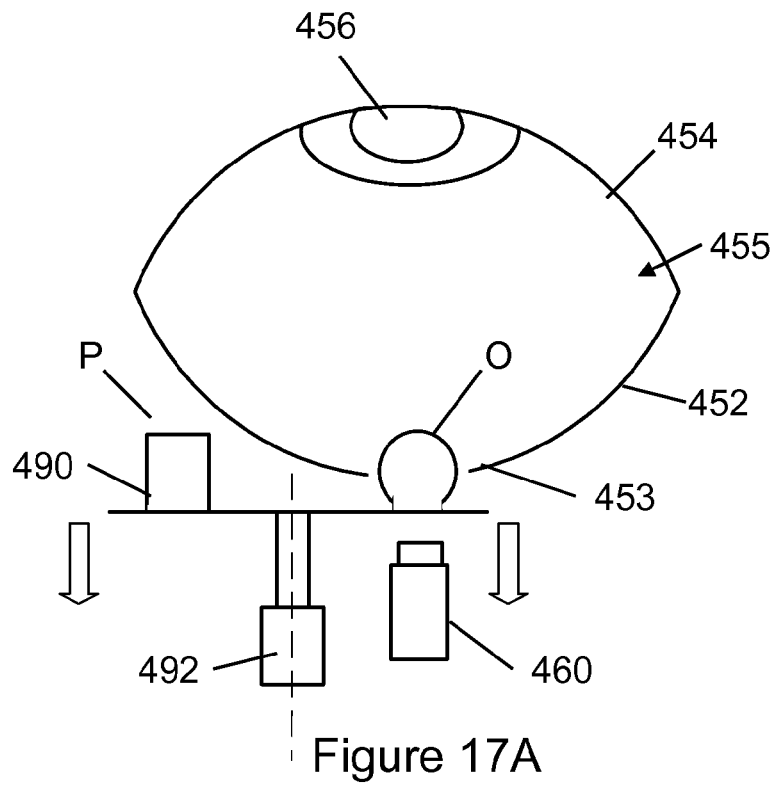
FIGS. 17A to 17D show the process of rotating the carousel of FIG. 16.
Figure 17B:
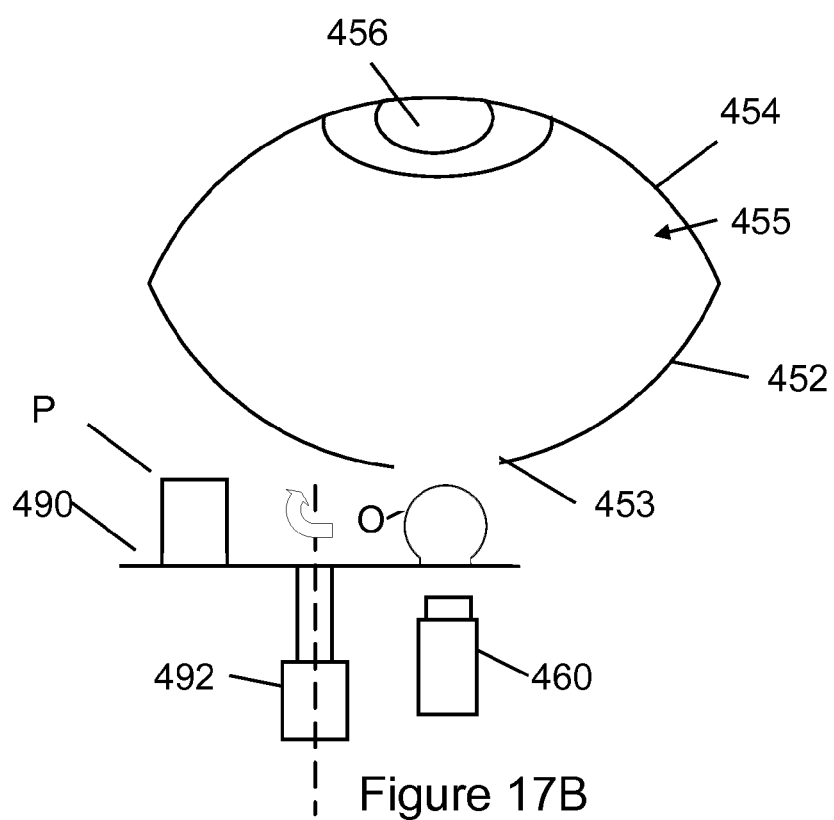
Figure 17C:
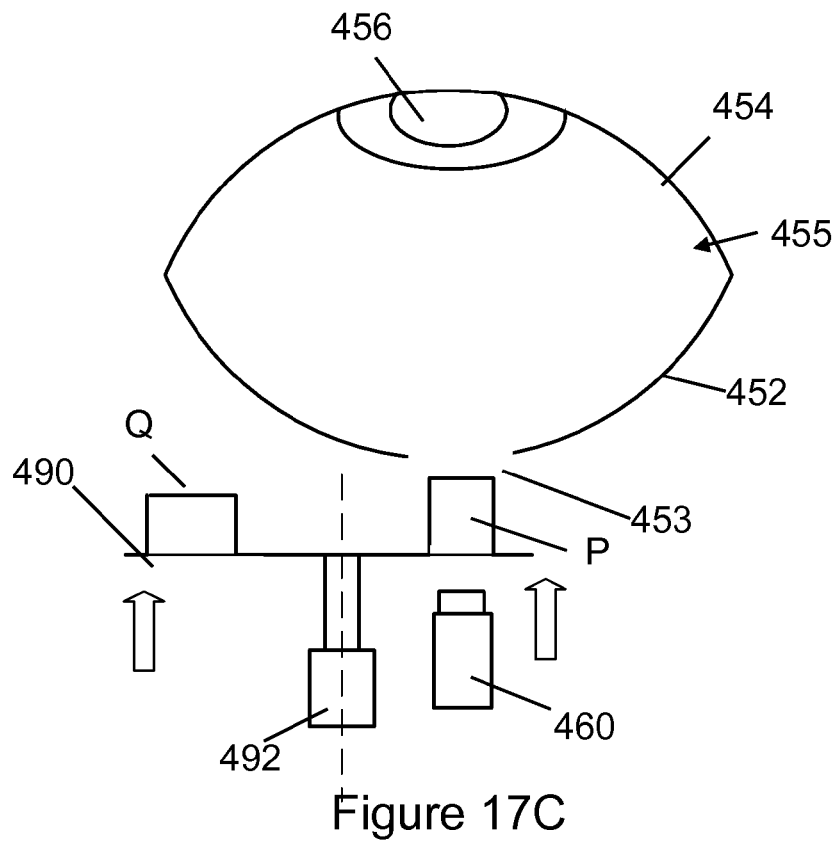
Figure 17D:
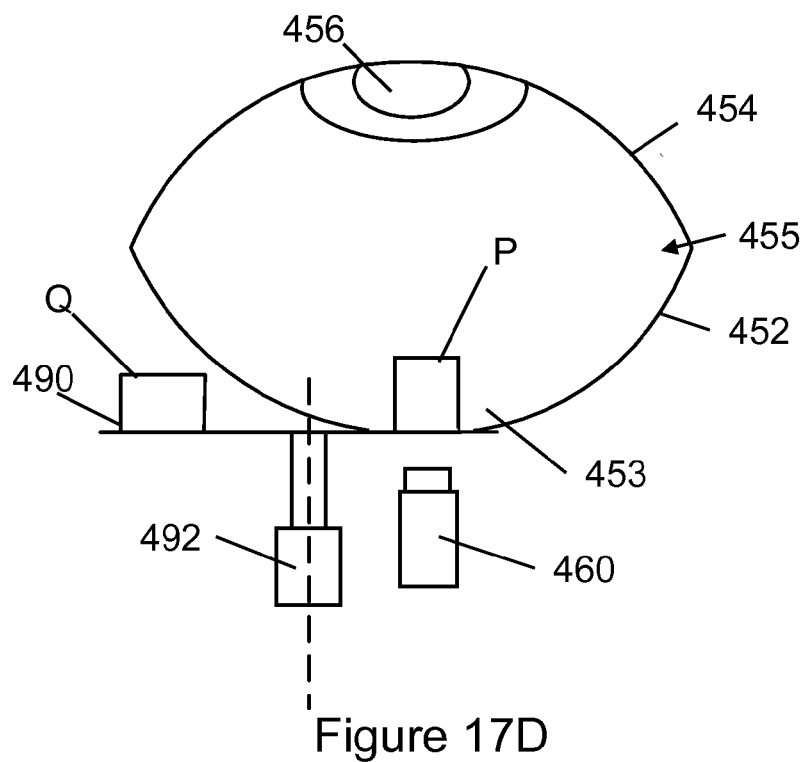

FIGS. 17A to 17D show the process of changing the 3D object to be holographed using the carousel 490 and dial and servo mechanism 492. As shown in FIG. 17A, object O is positioned within the enclosed space 455. In the event a user wants to change the 3D object to be holographed, the projection unit 460 is powered off and the first motor is actuated to lower carousel 490 below opening 453, such that the 3D object O is no longer positioned within the enclosed space 455, as shown in FIG. 17B. Once the carousel 490 has been lowered, the second motor rotates the carousel 490 until the desired 3D object P is positioned below the opening 453, as shown in FIG. 17C. Once the desired 3D object P is below the opening 453, the first motor is actuated to raise carousel 490 thereby to position the 3D object P within the enclosed space 455, as shown in FIG. 17D. With the 3D object P positioned within the enclosed space 455, the projection unit 460 is powered back on.

Although the image data projected onto the 3D object is described as representing texture on the 3D object, those skilled in the art will appreciate that other types of image data may be projected. For example, as shown in FIG. 18A, the image data may be in the form of text representing possible answers to a multiple choice question. In this embodiment, a user uses their finger to select one of the possible answers that appears on the holographic image of the 3D object positioned. Alternatively, the image data may be in the form of buttons that can be selected to increase or decrease variables in an environmental simulation system, as shown in FIG. 18B. In this embodiment, a user can increase a variable by sliding their finger towards the middle of the input region, and can similarly decrease a variable by sliding their finger away from the middle of the input region. The image data may also be in the form of buttons used to manipulate the orientation of the holographic image, as shown in FIG. 18C.

Although the sensing unit is described in some embodiments as utilizing capacitive sensors, those skilled in the art will appreciate that other types of sensors may be used. For example, IR sensors which provide information in terms of reflection from an emitter/receiver pair may be used. Alternatively, discrete sensors, analogue resistive sensors, or other conventional touch sensors may be used.

Although the projection unit is described as utilizing a projector, those skilled in the art will appreciate that alternatives are available. For example, a curved display could be used. In this embodiment, the curved display may be an OLED panel which emits light in response to electric current. Alternatively, plastic or organic display films could be used.

Although the sensing unit output is described as being sent to the master controller for processing, those skilled in the art will appreciate that the sensing unit may be sent directly to the general purpose computing device for processing.

Although embodiments of the interactive input system have been shown and described above, those of skill in the art will appreciate that further variations and modifications may be made without departing from the spirit and scope thereof as defined by the appended claims.

What is claimed is:

1. A three-dimensional (3D) interactive input system comprising:
    a holographic image generator defining an enclosed space to accommodate a 3D object and configured to generate a holographic image of the 3D object that appears adjacent an input region of said holographic image generator;
    a projection unit configured to project image data onto the 3D object, the image data projected onto the 3D object appearing on said holographic image;
    a sensing unit configured to detect user proximity to the input region;
    processing structure configured to process sensing unit output and in response, update image data projected by the projection unit;
    wherein said processing structure processes sensing unit output to recognize user input gestures and in response, updates image data projected by the projection unit;
    wherein said holographic image generator comprises a pair of opposing, generally concave mirrors having facing reflected surfaces and defining the enclosed space therebetween, said 3D object being positioned adjacent the center of one of said mirrors, the other of said mirrors having an opening therein adjacent the center thereof at which said holographic image appears, the opening defining said input region;
    wherein the sensing unit comprises a plurality of capacitive sensors positioned circularly around the perimeter of the input region;
    and wherein the sensors are oriented in a spiral pattern.

2. The 3D interactive input system of claim 1 wherein said user input gestures comprise at least one of finger movement, hand movement and fist movement adjacent said input region.

3. The 3D interactive input system of claim 2 wherein said processing unit updates image data projected by the projection unit such that the holographic image is manipulated in a manner consistent with user movement adjacent said input region.

4. The 3D interactive input system of claim 1 wherein the projection unit comprises a projector and at least one lens element, said at least one lens element receiving image data projected by said projector and directing the image data onto the surface of the 3D object.

5. The 3D interactive input system of claim 4 wherein said at least one lens element is a fisheye lens.

6. The 3D interactive input system of claim 1 wherein the image data represents texture on the 3D object.

7. The 3D interactive input system of claim 1 wherein the image data represents a plurality of possible answers to a question.

8. The 3D interactive input system of claim 3 wherein said processing structure compares user input gestures with a library to recognize the user input gestures and updates image data projected by the projection unit when user input gestures are recognized.

9. The 3D interactive input system of claim 1 further comprising a 3D object positioning unit configured to position the 3D object in the enclosed space.

10. The 3D interactive input system of claim 9 wherein said 3D object positioning unit supports a plurality of 3D objects and is actuable to position a selected one of said 3D objects in said enclosed space.

11. The 3D interactive input system of claim 10 wherein the one mirror has an opening therein adjacent the center thereof, said 3D object positioning unit inserting the selected 3D object through the opening in said one mirror and into the enclosed space.

12. The 3D interactive input system of claim 11 wherein said 3D object positioned unit comprises a carousel that is rotatable to align the selected 3D object with the opening in said one mirror.

13. The 3D interactive input system of claim 12 wherein said carousel is moveable towards and away from said one mirror to insert and remove the 3D object from the enclosed space.

14. A method comprising:
    projecting image data onto a 3D object positioned within a holographic image generator, the projected image data appearing on a holographic image of the 3D object generated by said holographic image generator;
    detecting user input gestures made proximate the holographic image by sensing unit;
    updating the image data projected on the 3D object based on detected user input gestures, thereby to manipulate the holographic image;
    processing sensing unit output to recognize user input gestures and in response, updating projected image;
    wherein said holographic image generator comprises a pair of opposing, generally concave mirrors having facing reflected surfaces and defining the enclosed space therebetween, said 3D object being positioned adjacent the center of one of said mirrors, the other of said mirrors having an opening therein adjacent the center thereof at which said holographic image appears, the opening defining said input region;

wherein the sensing unit comprises a plurality of capacitive sensors positioned circularly around the perimeter of the input region;

and wherein the sensors are oriented in a spiral pattern.

15. The method of claim 14 wherein the detecting comprise detecting user proximity and movement adjacent an input region proximate said holographic image to recognize user input gestures.

16. The method of claim 14 wherein the image data is manipulated in a manner consistent with user movement adjacent the holographic image.

\* \* \* \* \*